(12) United States Patent
Russo

(10) Patent No.: US 9,338,287 B1
(45) Date of Patent: May 10, 2016

(54) AUTOMATED VERIFICATION OF A TELEPHONE NUMBER

(71) Applicant: WhatsApp Inc., Santa Clara, CA (US)

(72) Inventor: Richard J. Russo, San Jose, CA (US)

(73) Assignee: WHATSAPP INC., Santa Clara, CA (US)

( * ) Notice: Subject to any disclaimer, the term of this patent is extended or adjusted under 35 U.S.C. 154(b) by 404 days.

(21) Appl. No.: 13/647,942

(22) Filed: Oct. 9, 2012

(51) Int. Cl.
H04M 3/42 (2006.01)
H04M 1/57 (2006.01)

(52) U.S. Cl.
CPC ............ *H04M 3/42042* (2013.01); *H04M 1/57* (2013.01)

(58) Field of Classification Search
CPC .................. H04M 3/42; H04M 3/537; H04M 3/42025–3/42127; H04M 1/57; H04M 1/575; H04M 2207/18; H04M 1/72519
See application file for complete search history.

(56) References Cited

U.S. PATENT DOCUMENTS

| | | | | | |
|---|---|---|---|---|---|
| 5,305,370 | A * | 4/1994 | Kearns | ................ | H04M 11/04 379/38 |
| 6,134,590 | A * | 10/2000 | Perlman | ................ | H04L 67/38 463/42 |
| 6,411,685 | B1 * | 6/2002 | O'Neal | ................ | H04L 12/58 379/100.08 |
| 7,876,743 | B2 * | 1/2011 | Garcia-Martin | ...... | H04M 7/123 370/338 |
| 8,463,235 | B1 * | 6/2013 | Antonov | ................ | H04M 3/436 455/410 |
| 8,660,246 | B1 * | 2/2014 | Brown | ................ | 379/114.13 |
| 2003/0043986 | A1 * | 3/2003 | Creamer | ................ | H04M 3/42 379/201.03 |
| 2003/0156694 | A1 * | 8/2003 | Lee | ................ | H04M 15/06 379/142.12 |
| 2007/0143481 | A1 * | 6/2007 | Roxburgh | ................ | H04L 63/18 709/227 |
| 2007/0197224 | A1 * | 8/2007 | Winkler | ................ | H04W 76/02 455/445 |
| 2007/0206747 | A1 * | 9/2007 | Gruchala | ................ | H04M 3/38 379/142.01 |
| 2008/0088428 | A1 * | 4/2008 | Pitre | ................ | G08B 25/016 340/506 |
| 2009/0136013 | A1 * | 5/2009 | Kuykendall | ......... | H04M 1/575 379/142.17 |
| 2010/0020941 | A1 * | 1/2010 | Walker, III | ........ | H04M 3/42059 379/38 |
| 2010/0088753 | A1 * | 4/2010 | Ayres | ................ | G06F 21/41 726/9 |
| 2010/0115588 | A1 * | 5/2010 | Johannesson | ....... | H04L 63/0892 726/4 |
| 2010/0273450 | A1 * | 10/2010 | Papineau | ................. | G06F 8/60 455/411 |
| 2011/0154098 | A1 * | 6/2011 | Kim | ................ | G06F 11/0709 714/3 |
| 2011/0246366 | A1 * | 10/2011 | Lai | ................ | G06Q 20/32 705/44 |
| 2013/0005368 | A1 * | 1/2013 | Hunziker | ............. | H04W 12/10 455/466 |
| 2013/0303133 | A1 * | 11/2013 | Sansalone | ........ | H04M 1/72519 455/414.1 |
| 2014/0098809 | A1 * | 4/2014 | Lawson | ............. | H04M 7/0021 370/352 |

* cited by examiner

*Primary Examiner* — Mehmood B Khan

(74) *Attorney, Agent, or Firm* — Kacvinsky Daisak Bluni, PLLC

(57) ABSTRACT

A system and method for automatically verifying a telephone number proffered by a user of an application. During registration or installation of the application, client software is installed on the user's mobile device (e.g., a smart phone, a tablet computer). One of a pool of telephone numbers for outgoing calls is selected, and a call is initiated to the proffered number by the system. The software executing on the user's device detects the incoming call, extracts caller identification data (i.e., the originating telephone number), formats a data communication (e.g., an http request) to include the data, and sends it to the system. The system receives the data communication and compares the data with the originating number. If they match, the user's telephone number is verified. The outgoing call from the system may be canceled before it rings at the device if the data communication is received in time.

14 Claims, 3 Drawing Sheets

US 9,338,287 B1

AUTOMATED VERIFICATION OF A TELEPHONE NUMBER

BACKGROUND

This invention relates to the fields of telephony and data communications. More particularly, systems and methods are provided for automated verification of a telephone number via outgoing caller identification data.

Users of computer services and applications are authenticated in many different manners, using cryptographic keys, passwords, biometric data and so on. Depending on the reason for authentication, some methods may be more appropriate or successful than others. The more onerous and complicated the authentication, the less likely it is that a user will want to undergo the process, and the less likely it is that the user will desire to continue using the service or application.

Also, some methods of authentication are more expensive than others. For services that are used by many people (e.g., online or distributed applications), costs involved with authenticating them may become quite substantial in the aggregate. And, although it is desirable to implement an authentication process that adequately protects the service and its operations, it is also desirable to make it as user-friendly as possible.

SUMMARY

In some embodiments of the invention, systems and methods are provided for automated verification of a user's telephone number. In these embodiments, a user's communication or computing device (e.g., a smart phone, a table computer, a laptop computer) is used to operate a software application. Client software is installed on the user's device as part of the application.

The application requires association of a telephone number with the user, for the purpose of sending and receiving communications to and from the user. The number is to be verified to ensure it is the user's.

The system selects one of a pool of telephone numbers from which to place a call to the user's device at the user's telephone number, and initiates the call. Application software on the device detects the incoming call, identifies the originating number (e.g., from the caller identification service), and issues a data communication to the system to report the originating number. Other data may be included in the communication (e.g., an identification of the user or the software instance).

The system compares the reported data with the actual originating number. If they match, the user's telephone number is verified and can be associated with the user (e.g., as his or her account name). If they don't match, or if the user's device or telephone service provider doesn't support this method, some other method of verifying the user's telephone number may be applied.

DETAILED DESCRIPTION

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, systems and method are provided for automatically verifying a user's telephone number, through automated verification of caller identification data of a call placed to the user communication or computing device (e.g., smart phone, tablet computer). Verification may be required in order to allow access to a service (e.g., an online application), to register the device for use with the service, to allow the user to be associated with the device (e.g., to use its telephone number as his or her identifier) and/or for some other reason.

In these embodiments, the call is placed with a selected originating number. The call is received by client software executing on the communication device, which extracts caller identification data (e.g., the ANI or Automatic Number Identification), assembles a data request (e.g., an http request) that reports the data, and issues the request toward the server. The server then verifies that the data is correct.

If the communication device has not yet rung, the call may be cancelled. If it does ring, the server may hang-up. Alternatively, if the call rings and the user answers it, and no data communication (or a communication with incorrect data) was received from the device, a different method of authenticating the user may be implemented. For example, the server may play a message that identifies an authentication code and asks the user to report the code via the client software, a web browser or other means, or that asks the user to identify the telephone number from which he or she was called.

Figure 1:
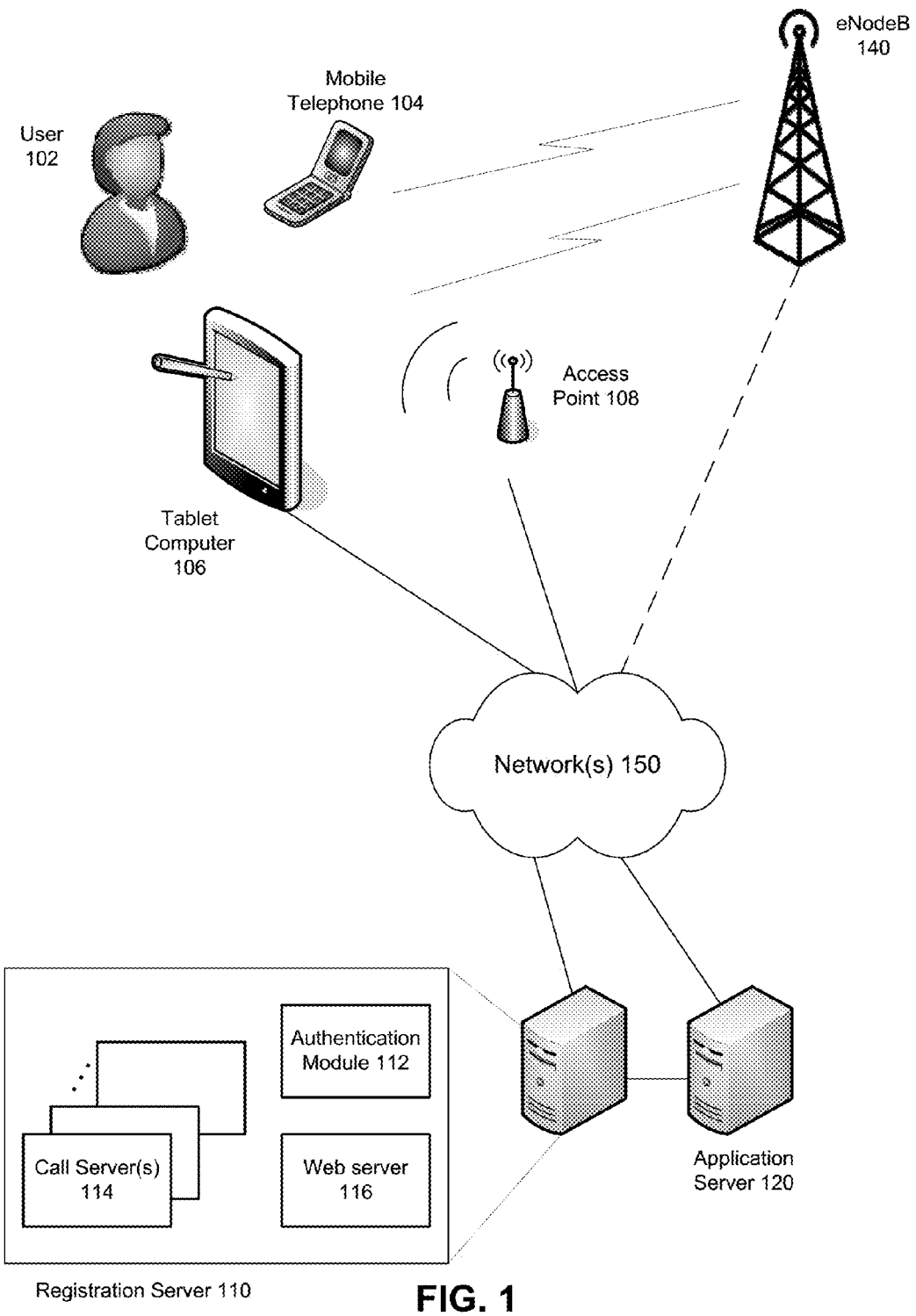
FIG. 1 is a block diagram depicting an environment in which some embodiments of the invention may be implemented.

FIG. 1 illustrates an environment in which some embodiments of the invention may be implemented. In these embodiments, user 102 employs one or more of mobile telephone 104 (e.g., a smart phone) and tablet computer 106 to operate a messaging or communication application hosted by application server 120. The application may run entirely on application server 120, or server 120 may host just a part of the application (e.g., as a chat server, a message processor or gateway, a data server, a communication server). The user may also, or instead, manipulate other devices in conjunction with the application, such as a desktop computer or laptop computer.

Telephone 104 is coupled to data network(s) 150, which may comprise the Internet and/or a network operated by the provider of application server 120, via eNodeB (or nodeB) 140 and a telephone service provider's network. Telephone 104 may also, or instead, have a data connection to network(s) 150 via access point 108. Tablet computer 106 may be coupled to network(s) 150 using a wired connection and/or a wireless connection (e.g., via access point 108). In some implementations, computer 106 may be coupled to a PBX or telephone company switch through a VOIP gateway or a comparable entity (not depicted in FIG. 1).

The telephone service provider's network may supply voice service according to any suitable wireless voice communication protocol, such as GSM (Global System for Mobile Communications), CDMA (Code Division Multiple Access) or a variant thereof. Devices 104, 106 of user 102 may have data communications via their service provider's network under a compatible data protocol such as LTE (Long Term Evolution), EDGE (Enhanced Data Rates for GSM Evolution), UMTS (Universal Mobile Telecommunications System), etc.

Application server 120 hosts an application or other electronic service enjoyed by user 102, who operates one or more of devices 104, 106 to communicate with and/or operate the application. In other embodiments, application server 120 may represent a system of computers that cooperate to perform the application (e.g., a chat server, a multimedia server, a messaging server, a communication server).

Although not shown in FIG. 1, a client application module is installed on a user's device to facilitate and cooperate with operation of the application. In particular, client software for accessing the application is downloaded to either of both of devices 104, 106, to allow the user to access some or all of the features of the application. The same and/or other features may be accessed by navigating a web browser or other software installed on telephone 104 and/or computer 106 to application server 120 and directly interacting with the application.

When user 102 registers and identifies a device as being one that she will use to interact with or operate the application, she also provides a telephone number associated with the device. The organization that operates application server 120 and registration server 110 will verify the telephone number as described herein.

Registration server 110 includes authentication module 112, call server(s) 114, and web server 116. In the interest of clarity, other components of the registration server are omitted (e.g., processor, storage).

Authentication module 112 comprises processor-executable instructions for verifying a telephone number identified by the user and associated with one or both of devices 104, 106. The client software installed on the device may assist in the verification of the telephone number.

A call server 114 comprises processor-executable instructions for placing and/or receiving telephone calls. In embodiments of the invention described herein, the organization providing the application maintains a pool of telephone numbers that can be used as the originating numbers of telephone calls placed by the call server(s). A call server 114 may signal or handle calls using SS7 (Signaling System No. 7), SIP (Session Initiation Protocol) and/or other voice communication protocols.

Web server 116 comprises processor-executable instructions for generating, receiving and/or handling data requests in HTTP (Hypertext Transport Protocol), HTTPS (Secure HTTP), FTP (File Transfer Protocol), SSH (Secure Shell), RPC (Remote Procedure Call) and/or other data communication protocols.

Registration server 110 and application server 120 are operated by the organization that provides the application, and may be just part of a larger system supporting the application. Additional details of some embodiments of such a system are provided below. Therefore, the functions of registration server 110 and application server 120 may be distributed in a different fashion, among additional hardware and/or software resources.

Figure 2:
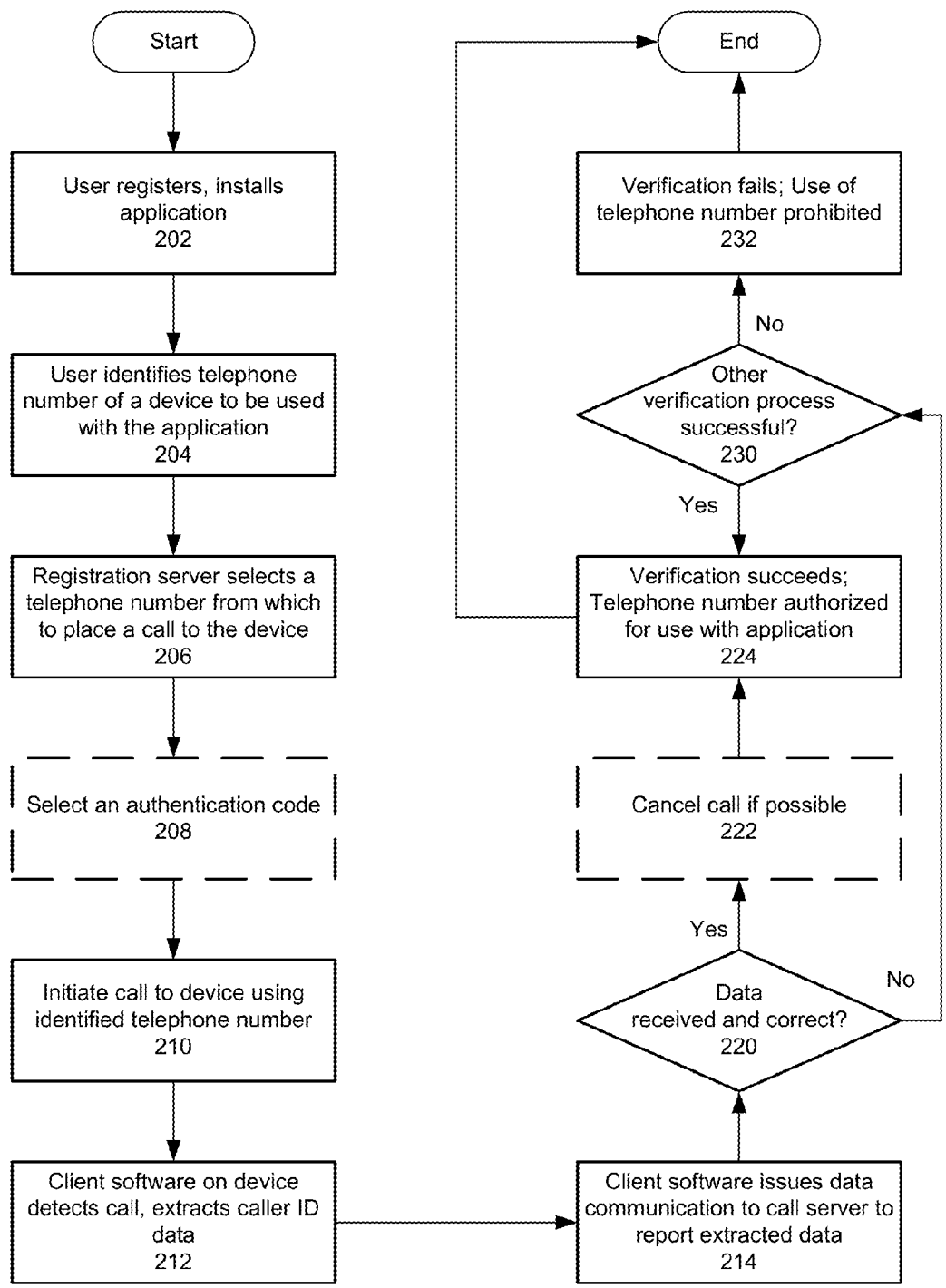
FIG. 2 is a flow chart illustrating a method of automatically verifying a telephone number, in accordance with some embodiments of the invention.

FIG. 2 is a flow chart demonstrating a method of automated verification of a user's telephone number by its caller identification data, according to some embodiments of the invention.

In operation 202, a user visits a website offering an online application or service, registers for use of the application and installs on a computer or communication device (e.g., a smart phone) client software that facilitates his use of the application with that device. The client software may be personalized or configured for the user and, as part of the installation process, identifiers of the device and/or the user may be reported to the application.

Illustrative identifiers include, but are not limited to, the device's IMEI (International Mobile Equipment Identity), ESN (Electronic Serial Number), IP (Internet Protocol) address or MAC (Medium Access Control) address, the user's IMSI (International Mobile Subscriber Identity) or TMSI (Temporary Mobile Subscriber Identity), etc.

In operation 204, the user identifies a telephone number of a device that will be used to access or operate the application, and on which client software was installed or will be installed. In the illustrated embodiment of the invention, the application requires a telephone number of the user to use as a user identifier and/or for other purposes. For example, if the application provides messaging capabilities (e.g., SMS (or Short Message Service) text messages, audio, images, video), the telephone number may be the origination/destination of outgoing/incoming messages. Otherwise, it may be used to route voice communications to/from the user.

If the user controls or has use of more than one telephone number, following operations may be performed for each number. If client software has not yet been installed on the device(s) associated with the telephone number, the software may be installed as part of operation 204. Illustratively, if the user obtains a new telephone number and wished to use it with the application, he may enter the method of FIG. 2 at operation 204.

In operation 206, a registration server or other component of the system that hosts the application and that performs the illustrated verification selects one of multiple available telephone numbers for placing calls from the system. This number will be used to place a call to the user's device to verify the user's access to or use of the device. In different implementations, the server may have different quantities of unique numbers to choose from (e.g., 100, 1000).

The system includes one or more call servers for actually handling calls. A call server may be a software module of the registration server or other system server, or may be a separate computer.

In optional operation 208, the registration server or other component of the system selects an authentication code. As described below, depending how the call that will be placed to the user's device proceeds, this code may or may not be needed. In illustrative implementations, the authentication code is a three or four digit numerical, alphabetic or alpha-numerical code.

In some embodiments of the invention, the N possible authentication codes (e.g., one thousand for a three-digit numerical code) are distributed or divided among the M telephone numbers (M>1) that may be used to place the call. Thus, in these embodiments, after the outgoing telephone number is selected, one of the approximately N/M authentication codes assigned to that number is chosen.

In other embodiments of the invention, this scheme is reversed; the authentication code is selected first, and the telephone number associated with that code is then identified. In yet other embodiments, any authentication code may be used with a call from any of the outgoing telephone numbers, and vice versa.

In operation 210, a call server module of the registration server initiates a call to the user's identified telephone number, from the selected origination number. In the illustrated method, the call is placed using SIP and VOIP telephony, but other mechanisms may be used in other embodiments. Depending on the type of device, the user's location, the user's service provider(s) and other factors, the call may be routed or delivered by a mobile telephone carrier, a VOIP gateway and/or some other entity.

In operation 212, the client software installed on the user's device detects the incoming call and extracts caller identification data—in particular, the originating (or billing) number of the call.

In operation 214, the client software issues a data communication to the registration server, the call server module from which the call was placed or some other part of the system to report the observed caller identification data. Illustratively, the communication may comprise an HTTP request.

The communication may also include an identifier of the device or subscriber (e.g., IMEI, IMSI, IP address), or an identifier of the client software instance. Illustratively, this identifier may have been reported to the system when the software was installed, and/or the client software may have been configured with a unique identifier. In the illustrated embodiment of the invention, an identifier of the device, subscriber and/or client software may be sent so that the system can easily identify the originator of the communication and ensure that the telephone number verification is being performed by the corresponding user and device.

In operation 220, the registration server (or call server or other system component) compares the data reported by the client software to the telephone number from which the call was placed. If the data match, the illustrated method continues at operation 222; otherwise, the method advances to operation 230 or ends. For example, if the client software was not able to detect the incoming call before the device rang, or if the device is not capable of sending a data communication at the same time that a voice connection is incoming, the method may proceed to operation 230.

In optional operation 222, the registration server or call server attempts to cancel the call. Illustratively, some communication device manufacturers and service providers allow the device to listen for incoming calls and to receive signaling data before the call actually rings at the device. In these situations, and if the client software's data communication is issued, received and processed quickly enough, the call may be able to be cancelled before it rings at the device. This may allow the system to avoid bothering the user, may allow the process to be fully automated, and may help reduce the cost of the verification process.

If the call cannot be cancelled before it rings at the user's device, it may be cancelled after it starts to ring. If the device rings and the user answers the call, a recorded message may be played (or a message may be generated and played) to inform him that the verification process has completed successfully.

In operation 224, verification of the user's identified telephone number has succeeded, and he will be able to use it as his identifier and/or as the origination or destination of communications. The user may be able to set a password for his account, or a default password may be assigned (e.g., the IMEI of his device, the IP or MAC address of his device, a random code). The method then ends.

In operation 230, the registration server attempts an alternative method of verifying the user's telephone number. For example, if the user answers the call, a recorded message may be played (or a message may be generated in real time and played) asking him to identify the telephone number from which he was called, or telling him the authentication code, and instructing him to submit the telephone number or code to the application.

In different implementations, the submission of an authentication code or verification information to the application may be done in different ways, such as by operating the client software and/or navigating a web browser to the application website, then typing in the originating telephone number or authentication code, by initiating a text (or other) message to the application or the system, by speaking the telephone number or code during the call or entering it on the device's keypad (i.e., to generate corresponding DTMF or dual-tone multi-frequency signaling), etc.

As another alternative method of verification, a text message may be sent to the user's device (e.g., via SMS) with the authentication code. The user would be requested to report the code he received to the application, possibly using one of the methods enumerated above. Or, the client software on the user's device may parse the message and automatically verify it to the registration server (or other system component).

In a different version of this method, the user's device may be instructed to initiate a loopback message, wherein a text message is sent from the device, through the user's service provider network, and back to the device. This operation may not be available with some devices or telephone service providers.

As another alternative method, if the user's IMSI is known, a reverse look-up may be performed to identify his telephone number. This method may be combined with another method to provide greater confidence that the proffered telephone number is indeed the user's.

If an alternative process for authentication or verification is successful, the illustrated method continues at operation 224.

Otherwise, in operation 232, verification of the user's identified telephone number is deemed to have failed, and the user will not be able to use that number as his identifier or as an origination or destination of communications. After operation 232, the method ends.

The process illustrated in FIG. 2 is but one method of verifying a user's access to, use of or control over a proffered telephone number. Other methods may be derived from discussions herein without exceeding the scope of the invention.

Figure 3:
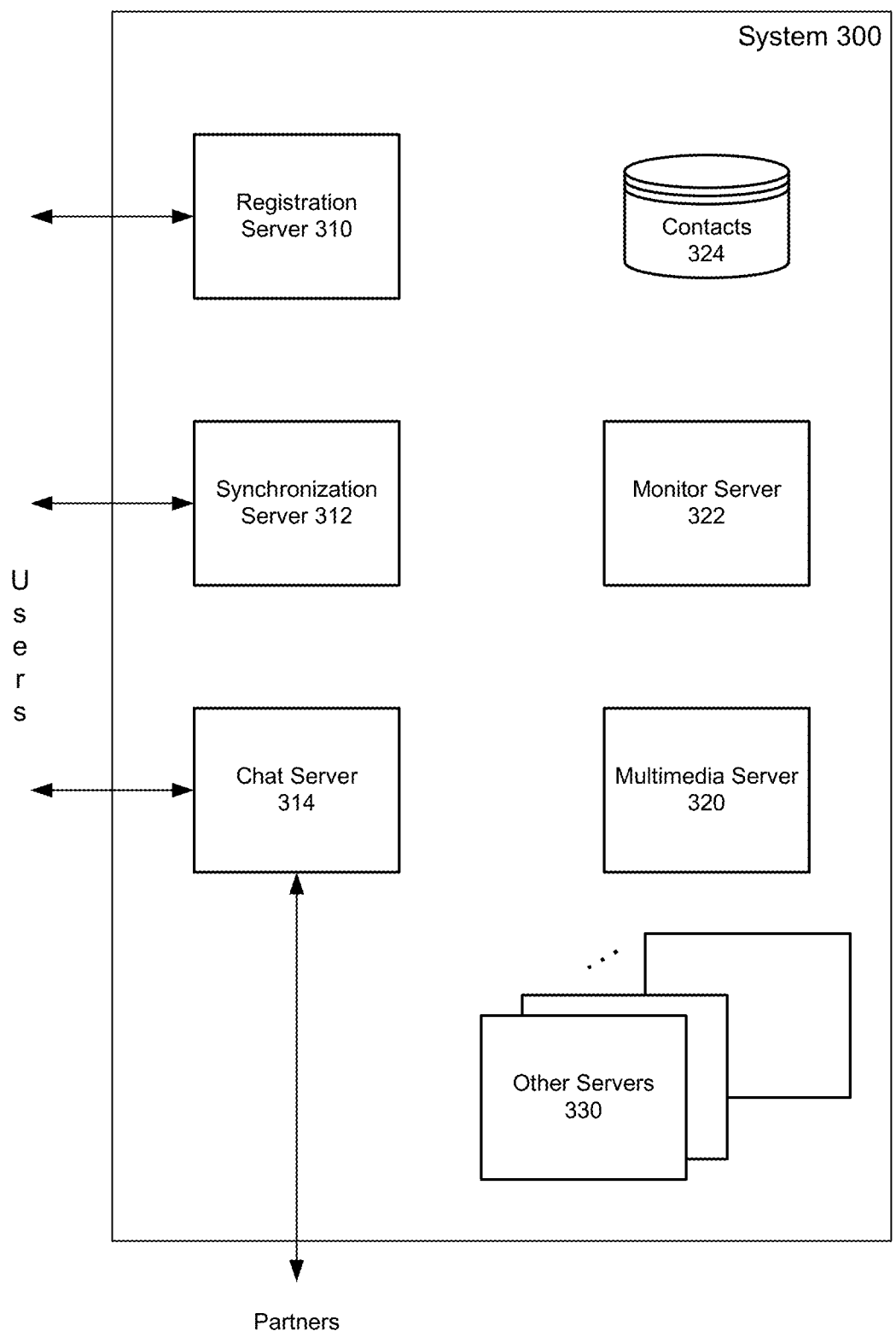
FIG. 3 is a block diagram of a system in which a user's telephone number may be verified automatically, in accordance with some embodiments of the invention.

FIG. 3 is a block diagram of a system in which a user's telephone number may be automatically verified, according to some embodiments of the invention. In these embodiments, system 300 is a data center, computer network or other amalgamation of computer resources for hosting an application accessed by distributed users. In some implementations, the application provides users with instant messaging of text, audio, photos, video and multimedia, from a mobile communication or computing device (e.g., smart phone, tablet computer, laptop) and/or a traditional computers (e.g., workstation, personal computer).

The application works with various device platforms (e.g., iPhone, Android, BlackBerry, Symbian, WP7), executed under their native operating systems. A user operating one type of device and subscribing to one communication server provider can exchange messages with users operating other types of devices and subscribing to other communication service providers. Individual messages may be sent to any number of recipients, and a group form of communication (e.g., chat) is offered in which multiple users interactively exchange instant messages.

Although single instances of some servers are depicted in FIG. 3, embodiments of the invention are not limited to a single one of each entity described herein. For example, although a single chat server 314 is illustrated, any number of chat servers may be deployed. In some embodiments of the invention, the functions of multiple system servers may be combined or the functions of a single server may be divided among multiple servers. Yet further, although each server depicted in system 300 represents a separate server computer in the block diagram, in other embodiments they may represent software processes executing on any number of server computers.

Registration server 310 registers users, downloads client software for operation on users' devices and automatically verifies users' telephone numbers. After being verified, a user's telephone number will serve as her identifier within the system and/or for communication with other users. In other embodiments of the invention, client software is downloaded from another source, such as a web server within system 300, an electronic marketplace (e.g., the App Store for the Apple® iPhone, Google Play for the Android™ platform, Ovi store for Nokia), etc.

Contacts 324 comprise contact information for all users registered with system 300, and may store each user's individual address book identifying other system users they know and/or with whom they communicate. Each user may be identified by a telephone number, and new users (and their contacts) are added to contacts 324 as described next.

Synchronization server 312 synchronizes a user's contacts with a global address list of the application, which may be stored in contacts storage 324. For example, after a user's telephone number is verified and she is registered with system 300, entries in an address book on her device are uploaded to and processed by the synchronization server.

Processing of the user's contacts may involve normalizing the entries, or at least their telephone numbers, and then matching the entries to contacts 324. Normalization may serve to remove extraneous characters, punctuation, spacing and so on in the contacts' telephone numbers (and/or other fields, such as name). Normalization can also ensure that telephone numbers of users' contacts are in the correct international format. Without the correct format, some attempts to their contacts may fail. Also, by applying the same format to all contacts' telephone numbers, they can be readily compared and a search can be conducted without concern that a matching entry will be missed because of having a different format.

After being normalized, each contact (e.g., each contact telephone number) is searched for in contacts 324. The result of the synchronization is a list of the user's contacts that are already registered within the system. Every time the user adds a new contact to her device's address list (and/or on a regular or periodic schedule), the new contact(s) may be synchronized.

Subsequent to synchronization, when the user selects a synchronized contact as the recipient of a message, the client software installed on her device will provide the functionality offered by the application (e.g., to send various types of data, to chat with multiple users simultaneously). If the user selects as a recipient a contact not included in contacts 324, the message to that contact may be sent using other messaging software of the device or may be sent in a default format (e.g., text only). In some implementations, the client software may operate in place of the device's previous messaging software, to handle all of the user's messages.

Chat server 314 receives a user's request for a chat session with one or more other users, and establishes connections with the users that will participate in the chat. The chat server may be coupled to partner entities (e.g., telephone service providers, device manufacturers), to enable waking of sleeping devices, delivery of messages to offline devices and/or for other purposes.

Multimedia server 320 processes multimedia data in transit from one user to another, and may be accessible to users through chat server 314 and/or directly (e.g., via a web interface). For example, a user may be able to upload a media file to the multimedia server for sharing among members of a chat session, for forwarding to one or more recipients and/or for other purposes.

Monitor server 322 monitors user communications. In some implementations, the communications are monitored to detect unwanted or undesirable traffic, such as spam, pornography and so on. Different users may express a desire to block or eliminate different types of objectionable traffic, and the monitor server may assist in this regard. Monitor server 322 may also examine communications for evidence of spam and to try to identify spammers. Identified spammers may be denied use of the system. If a user is suspected of sending spam, she may be placed on a watch list and her activities may be watched more closely.

Other servers 330 may be deployed for various purposes, such as to maintain session states of connected users, maintain user accounts, facilitate group chatting, monitor user presence (e.g., determine whether a user is online or offline), provide a web-based interface, etc.

In some embodiments of the invention, system 300 comprises some or all components or functionality of a synthetic communication server or system described in U.S. patent application Ser. No. 12/732,182, which was filed Mar. 25, 2010, is titled "Synthetic Communication Network and System," is assigned to the assignee of the present invention, and is incorporated herein for all purposes. The synthetic communication network provides a communication framework that bypasses telephone service providers' data channels and instead forms a network involving users' devices, system 300 and intervening data networks.

The environment in which some embodiments of the invention are implemented may incorporate a general-purpose computer and/or a special-purpose device such as a hand-held computer or communication device. Some details of such devices (e.g., processor, memory, data storage, display) are omitted for the sake of clarity.

Data structures and code described in this detailed description are typically stored on a non-transitory computer-readable storage medium, which may be any device or medium that can store code and/or data for use by a computer system. Non-transitory computer-readable storage media includes, but is not limited to, volatile memory, non-volatile memory, magnetic and optical storage devices such as disk drives, magnetic tape, CDs (compact discs), DVDs (digital versatile discs or digital video discs), or other non-transitory computer-readable media now known or later developed.

The methods and processes described in the detailed description can be embodied as code and/or data, which can be stored in a non-transitory computer-readable storage medium as described above. When a processor or computer system reads and executes the code and/or data stored on the medium, the processor or computer system performs the methods and processes embodied as data structures and code and stored within the medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A processor-implemented method of automated verification of a telephone number, the method comprising:
   identifying a destination telephone number;
   selecting one of multiple origination telephone numbers;
   initiating a call to the destination telephone number assigned to a device from the selected origination telephone number, the called device configured to listen for incoming calls and receive signaling data before an incoming call rings at the called device;
   receiving, from the called device, a data communication comprising a telephone number extracted from the signaling data of the call before the call rings at the called device;
   comparing the telephone number of the data communication to the selected origination telephone number before the call rings at the called device;
   allowing access by a client software application on the called device to a service, when the telephone number of the data communication matches the selected origination telephone number; and
   canceling the call before the call rings at the called device when the telephone number of the data communication matches the selected origination telephone number.

2. The method of claim 1, wherein the data communication further comprises an identifier of one or more of:
   the called device; and
   a user of the called device.

3. The method of claim 1, wherein the data communication further comprises an identifier of a software instance installed on the called device.

4. The method of claim 1, further comprising:
   selecting an authorization code; and
   if the call is answered:
      playing the authorization code; and
      requesting the authorization code be reported.

5. The method of claim 1, further comprising:
   if the call is answered, requesting the telephone number from which the call was received be reported.

6. The method of claim 1, wherein said initiating the call comprises dialing the destination telephone number.

7. The method of claim 1, wherein said initiating the call comprises signaling the destination telephone number.

8. A non-transitory computer-readable medium storing instructions that, when executed by a processor, cause the processor to perform an automated method of verification of a telephone number, the method comprising:
   identifying a destination telephone number;
   selecting one of multiple origination telephone numbers;
   initiating a call to the destination telephone number assigned to a device from the selected origination telephone number, the called device configured to listen for incoming calls and receive signaling data before an incoming call rings at the called device;
   receiving, from the called device, a data communication comprising a telephone number extracted from the signaling data of the call before the call rings at the called device;
   comparing the telephone number of the data communication to the selected origination telephone number before the call rings at the called device;
   allowing access by a client software application on the called device to a service, when the telephone number of the data communication matches the selected origination telephone number; and
   canceling the call before the call rings at the called device when the telephone number of the data communication matches the selected origination telephone number.

9. An apparatus for automatically verifying a telephone number, comprising:
   a processor;
   a memory;
   authentication logic executable by the processor of the apparatus to identify one of a pool of origination telephone numbers from which to place a call to a device having a first telephone number, the called device configured to listen for incoming calls and receive signaling data before the call rings at the called device;
   call logic executable by the processor of the apparatus to initiate the call to the called device from the identified origination telephone number, and cancel the call before the call rings at the called device; and
   data communication logic executable by the processor of the apparatus to receive a data communication from the called device before the call rings at the called device, compare a telephone number reported in the data communication to the identified origination telephone number, allow access by a client software application on the called device to a service, when the telephone number of the data communication matches the identified origination telephone number, and cause the call to be canceled before the call rings at the called device when the telephone number of the data communication matches the identified origination telephone number.

10. The apparatus of claim 9, wherein the authentication logic is further executable by the processor to select an authentication code for the call.

11. The apparatus of claim 10, further comprising:
   voice communication logic executable by the processor to play the authentication code during the call if the call is answered.

12. A system for verifying a telephone number, comprising:
   an application server hosting an application accessed by devices having associated telephone numbers; and
   a registration server for verifying a proffered telephone number of a first device, the first device configured to listen for incoming calls and receive signaling data before an incoming call rings at the first device, the registration server comprising:
      a call server for initiating a call to the proffered telephone number from a selected origination number, and canceling the call before the call rings at the proffered telephone number; and
      a communication module for receiving a data communication from the first device before the call rings at the proffered telephone number;
      wherein the data communication reports a telephone number from which a call was received at the first device;
   the registration server further to allow access by a client software application on the first device to the hosted application, when the telephone number of the data communication matches the identified origination telephone number, and to cause the call to be canceled before the call rings at the first device when the telephone number of the data communication matches the identified origination telephone number.

13. The system of claim 12, wherein the registration server is configured to:
   download client software to the first device; and
   obtain unique identifiers of one or more of:

the first device; and
a user of the first device.

14. The system of claim 13, wherein the data communication further comprises the unique identifiers.

* * * * *